US008972864B2

(12) United States Patent
Voreis et al.

(10) Patent No.: US 8,972,864 B2
(45) Date of Patent: Mar. 3, 2015

(54) WEBSITE LIST NAVIGATION

(71) Applicant: Microsoft Corporation, Redmond, WA (US)

(72) Inventors: Eric Voreis, Bothell, WA (US); Bo Rohlfsen, Seattle, WA (US); Matthew J. Schoenholz, Seattle, WA (US); Neil Cueto, Lynnwood, WA (US); Rodger Benson, Seattle, WA (US); Michael Kim, Redmond, WA (US); Raman Sarin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 208 days.

(21) Appl. No.: 13/766,476

(22) Filed: Feb. 13, 2013

(65) Prior Publication Data
US 2014/0229842 A1 Aug. 14, 2014

(51) Int. Cl.
*G06F 3/00* (2006.01)
*G06F 17/30* (2006.01)
*G06F 3/0488* (2013.01)

(52) U.S. Cl.
CPC ...... *G06F 17/30899* (2013.01); *G06F 3/04886* (2013.01)
USPC ............ 715/738; 715/740; 345/173; 345/157

(58) Field of Classification Search
CPC .................................. G06F 3/04886
USPC ............................ 715/738–740; 345/173, 157
See application file for complete search history.

(56) References Cited

U.S. PATENT DOCUMENTS

| 6,670,970 | B1 * | 12/2003 | Bonura et al. ................ 715/768 |
| 7,010,761 | B2 * | 3/2006 | Chatani et al. ................ 715/861 |
| 7,076,546 | B1 | 7/2006 | Bates et al. |
| 7,167,901 | B1 | 1/2007 | Beadle et al. |
| 7,480,694 | B2 | 1/2009 | Blennerhassett et al. |

(Continued)

OTHER PUBLICATIONS

Hilerio, Israel, "Pinned Sites: Windows 7 Desktop Integration with Internet Explorer 9", Retrieved at <<http://msdn.microsoft.com/en-us/library/gg131029(v=vs.85).aspx>>, Sep. 15, 2010, pp. 5.

(Continued)

*Primary Examiner* — William Titcomb
(74) *Attorney, Agent, or Firm* — Aaron Chatterjee; Kate Drakos; Micky Minhas

(57) ABSTRACT

Embodiments are disclosed that relate to facilitating navigation through a predefined list of websites, such as a list of favorite websites. One embodiment provides a method of operating a web browser. The method comprises receiving a user input corresponding to a web address list navigation command, and sending to the display device a representation of a navigational overlay that illustrates a change of a current location within a predefined list of web addresses responsive to the user input. The method further comprises, after sending the representation of the navigational overlay, ceasing sending of the representation of the navigational overlay to the display device, and sending to the display device a representation of website content obtained from a web address at the current location within the predefined list of web addresses.

20 Claims, 6 Drawing Sheets

(56) References Cited

U.S. PATENT DOCUMENTS

| | | | |
|---|---|---|---|
| 7,870,511 B2 * | 1/2011 | Suzuki | 715/861 |
| 8,146,003 B2 * | 3/2012 | Gruen et al. | 715/756 |
| 2002/0070963 A1 | 6/2002 | Odero et al. | |
| 2003/0001887 A1 * | 1/2003 | Smith, IV | 345/741 |
| 2003/0076344 A1 * | 4/2003 | Chatani et al. | 345/711 |
| 2007/0143683 A1 * | 6/2007 | Quimby | 715/730 |
| 2009/0276730 A1 * | 11/2009 | Aybes et al. | 715/825 |
| 2010/0162168 A1 | 6/2010 | Lee et al. | |

OTHER PUBLICATIONS

"How to add Jump List items to your Word Press Site for 1E9", Retrieved at <<http://pureinfotech.com/2010/09/21/how-to-add-jump-list-items-to-your-wordpress-site-for-ie9/>>, Sep. 9, 2010, pp. 5.

Jurdzik, Gunnar, "Firefox Help—Tutorials: Bookmarks", Retrieved at <<http://mozilla.gunnars.net/firefox_bookmarks_tutorial.html>>, Retrieved Date: Oct. 3, 2012, pp. 6.

* cited by examiner

WEBSITE LIST NAVIGATION

BACKGROUND

Web browsers often allow users to define lists of websites, such as favorites lists. Such lists may facilitate navigation to website within a list, as a user merely needs to open the list and select a website from the list, rather than typing in an address of the website into a navigation bar or a search term into a search engine.

SUMMARY

Embodiments are disclosed that relate to facilitating navigation within a predefined list of websites. For example, one disclosed embodiment provides, on a computing device, a method of operating a web browser. The method comprises receiving a user input corresponding to a web address list navigation command, and sending to the display device a representation of a navigational overlay illustrating a change of a current location within a predefined list of web addresses responsive to the user input. The method further comprises, after sending the representation of the navigational overlay that illustrates the change in current location within the predefined list of web addresses, ceasing sending of the representation of the navigational overlay to the display device, and sending to the display device a representation of website content obtained from a web address at the current location within the predefined list of web addresses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, web browsers often allow users to define lists of favorite websites. The inclusion of a website in a list may facilitate navigation to the website, as a user merely needs to open the list and select a website from the list, rather than typing in an address of the website into a navigation bar or search engine form manually.

However, browsing between website addresses within the list may involve manually opening the list and then selecting a new website from the list each time a user wishes to navigate to a new web site in the list. Additionally, in environments in which a user is using an input device other than a device that lets a user interact directly with a hardware or software keyboard, navigating between websites in such a list may pose additional challenges. For example, where a web browser is operated on a video game console by a user via a hand-held video game controller, interacting with a graphical user interface via the video game controller may be cumbersome. Often, such interactions involve a user manually navigating to each user interface control element (e.g. software keyboard key, menu item, etc) via a directional pad or other directional controller, which may require many user inputs to make a desired selection.

Accordingly, the disclosed embodiments allow a user to navigate a list of websites in a serial manner, such that the user may browse forward or backward through the list without having to manually select a website from a view of the list and without having to enter a uniform resource locator (URL). This may allow such navigation to be performed with video game controllers, handheld television remote controllers, depth cameras, and other input devices in an intuitive manner. Further, the disclosed embodiments provide user interfaces that facilitate such navigation so that a user can visualize a current location in a list of websites, and thus view navigational progress toward a desired end location. It will be understood that a user may define multiple playlists for independent consumption, and browse each one serially and separately from the others. Further, different users may each define different lists for independent consumption.

Figure 1:
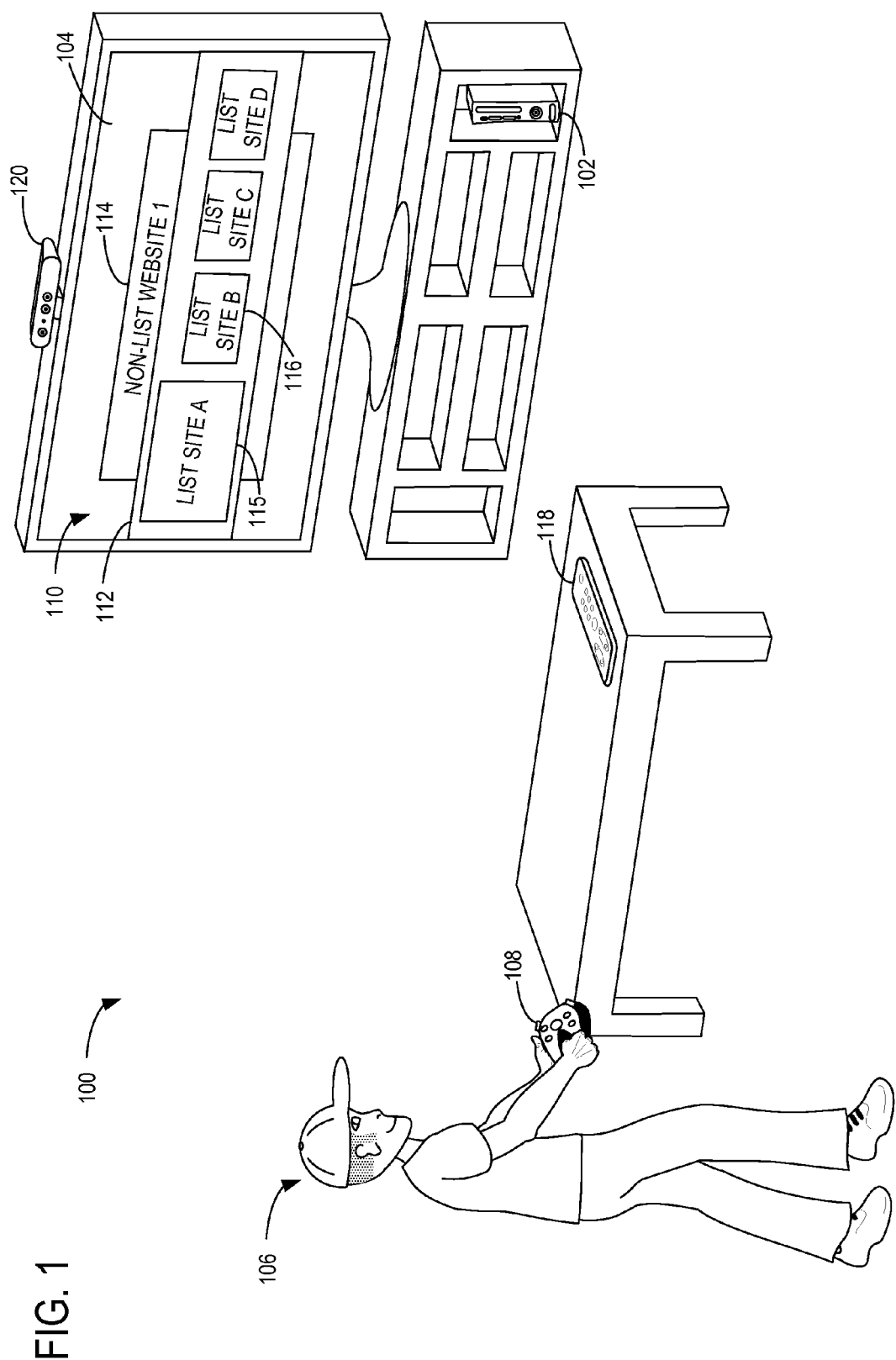
FIG. 1 shows an example embodiment of a web browser use environment.

FIG. 1 shows an example use environment 100 for navigating a list of websites. The use environment 100 comprises a computing device 102 in the form of a video game console in communication with a display device 104 such that the computing device 102 may output video content to the display device 104. A user 106 is illustrated as interacting with the computing device 102 via a handheld video game controller 108 to control navigation of a list of websites via a web browser executed on the computing device 102. As such, an embodiment of a website list navigational user interface 110 is displayed on display device 104. As will be described in more detail below, the website list navigational user interface 110 comprises a navigational overlay 112 displayed over a background 114 that, in FIG. 1, comprises a view of a website that the user was most recently viewing. The navigational overlay 112 shows representations of each website in the list, examples of which are shown as website A 115 and website B 116. The representations may take any suitable form, such as image captures of previously-viewed forms of the websites in the list, fixed representations of each website, text images showing the URLs of the websites, etc. While described herein in the context of a video game console, it will be understood that any other suitable computing device may be used. Examples include, but are not limited to, desktop computers, laptop computers, notepad computers, tablet computers, smart phones, portable media players, and any other suitable type of device.

The use environment 100 also illustrates other possible user input mechanisms for interacting with the web browser. For example, a user may navigate web sites via a remote control device 118, such as a remote control used to control a television or stereo. Additionally, a user may navigate via gesture and/or voice commands detectable by a sensor system 120. Sensor system 120 may comprise any suitable sensor or sensors, including but not limited to a two dimensional image sensor (e.g. an RGB or grayscale sensor), a depth image sensor (e.g. a time of flight or structured light depth sensor), a stereo camera system, one or more microphones (e.g. a directional microphone array), and/or any other suitable sensors.

Each of the depicted input mechanisms may not be as well suited for interacting a traditional web browser user interface, as such traditional web browser interfaces often implement favorites lists as drop down menus or other user interface elements better suited for a traditional cursor control mechanism, such as a mouse or touch sensitive display. In contrast, as will be described in more detail below, a user may initiate and conduct navigation of a list of websites in the depicted embodiments with simple forward and backward navigation commands, thereby allowing navigation to occur without precise selection of a specific location on a graphical user interface. As such, such easy-to-use combinations of controls, such as left/right bumper buttons on video game controller 108, channel up/down buttons on remote control device 118, left/right arm or hand swipe motions detectable via sensor system 120, voice commands, and the like may be used for website list navigation.

Figure 2:
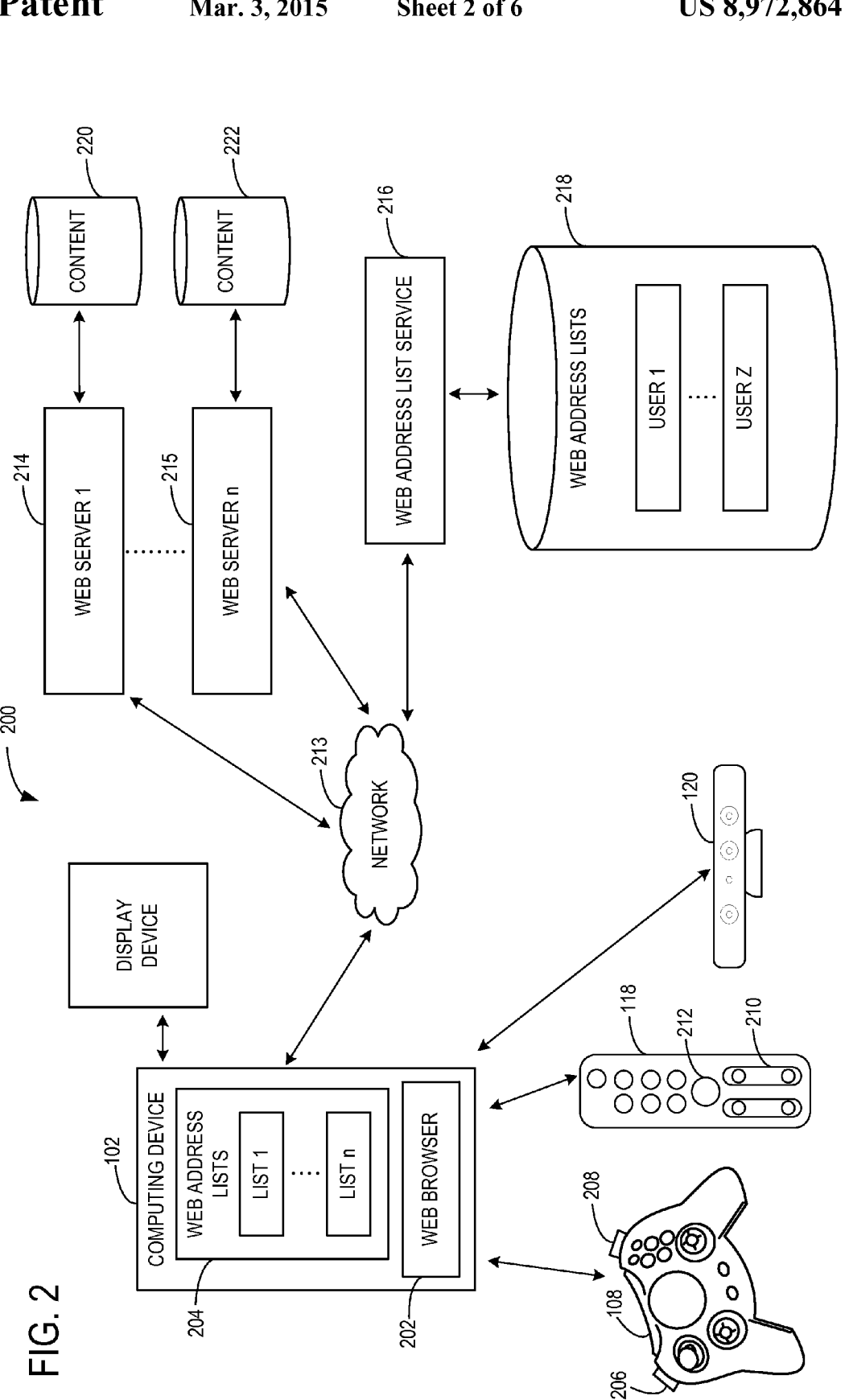
FIG. 2 shows a block diagram of an embodiment of a web browsing environment.

FIG. 2 shows a block diagram of an embodiment of a web browsing environment 200 that includes computing device 102. As shown, the computing device 102 includes a web browser 202 configured to obtain and effect the display of website data via the display device 104. Further, the computing device includes one or more lists 204 of websites stored thereon, which are illustrated as an arbitrary number n of website lists. The lists of websites may correspond to favorites lists of one or more users of the computing device 102, and/or may correspond to any other suitable type of list.

The computing device 102 is depicted as being in communication with the video game controller 108, the remote control device 118, and the sensor system 120. Various controls are shown for these input devices. For example, left and right bumper buttons (hereinafter "bumpers") are shown respectively at 206 and 208 for video game controller, while up/down (e.g. channel, volume, etc.) and directional pad controls are shown respectively at 210 and 212 for remote control device 118. Each of these input devices has other controls as well that may be used for website list navigation as described herein, such as directional pad and/or thumbsticks for video game controller 108. It will be understood that these user input devices are depicted for the purpose of example, and that any other suitable user input device may be used in connection with any other suitable type of computing device.

Computing device 102 may be in communication with various remotely located computing devices via a network 213. For example, computing device 102 may be in communication with web servers, illustrated as web server 1 214 and web server n 215, from which website content may be obtained for display. Further, in some embodiments, computing device 102 may communicate with a remote service that stores user profiles and information for users of client computing devices, such as computing device 102. In such embodiments, a remote web address list service 216 may be configured to store web address lists for a plurality of the users. Such a service may allow a web address list to be easily synchronized between multiple client devices of a user, etc. Web address list service 216 is depicted as being connected to a local web address list store 218, but web address lists and/or other user info may be stored remotely from the service. Likewise, website content stores 220, 222 may be local to web servers 214, 215, as depicted, or may be located remotely from associated servers.

Figure 3:
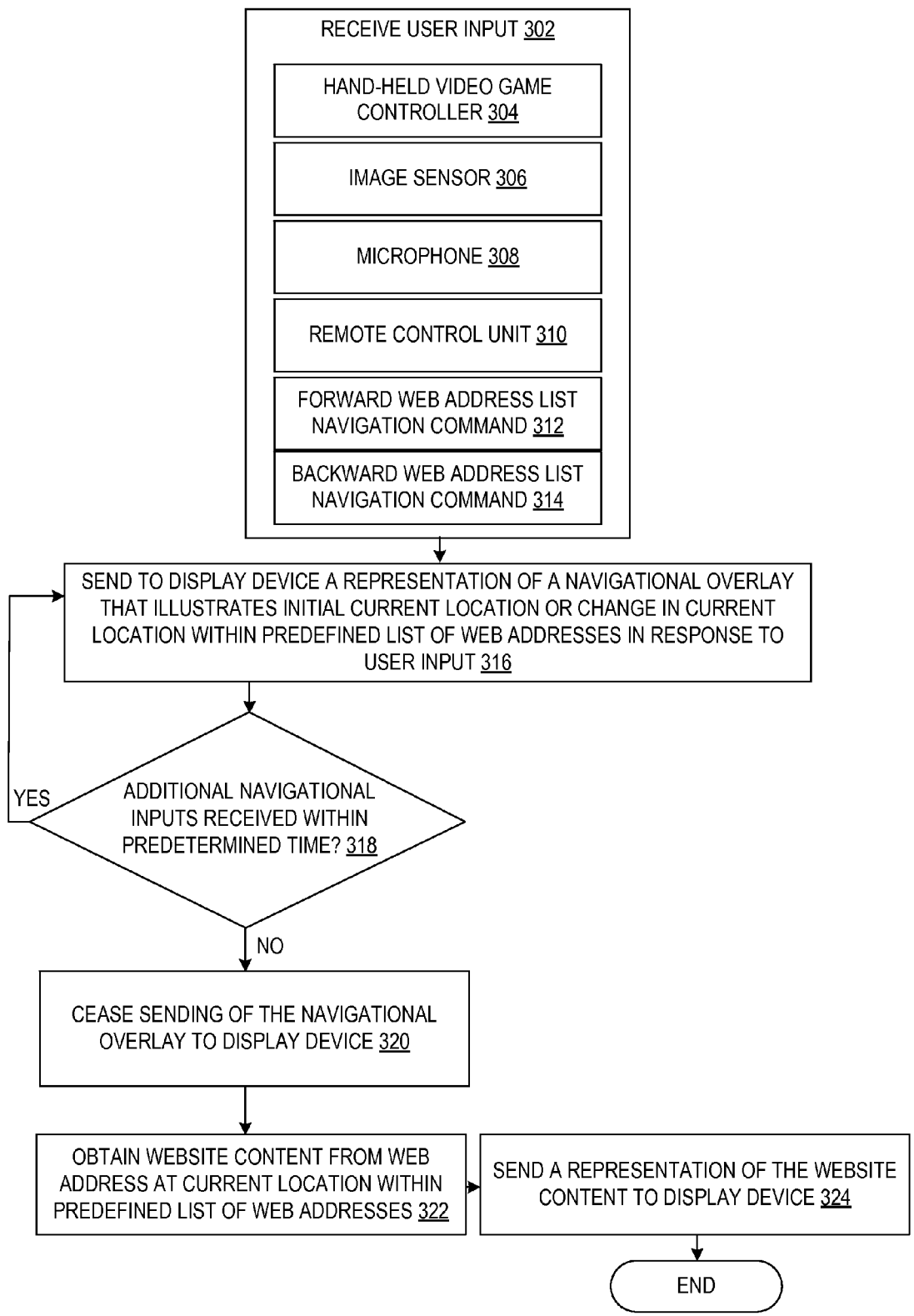
FIG. 3 shows a flow diagram depicting an embodiment of a method for navigating a list of websites.
Figure 4A:
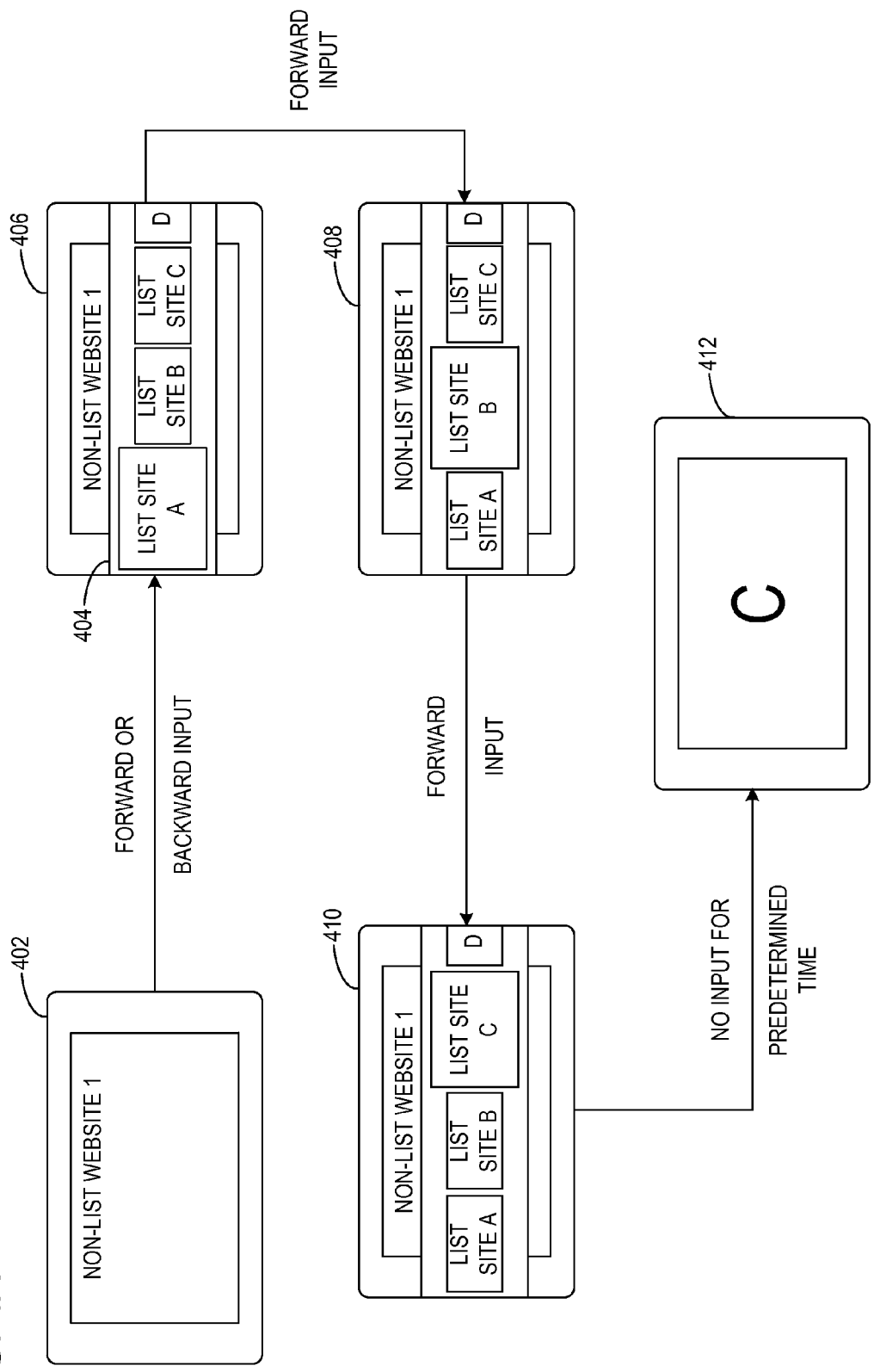
FIGS. 4A-4B show a schematic depiction of a series of website list navigation commands and corresponding responses displayed according to an embodiment of the present disclosure.
Figure 4B:
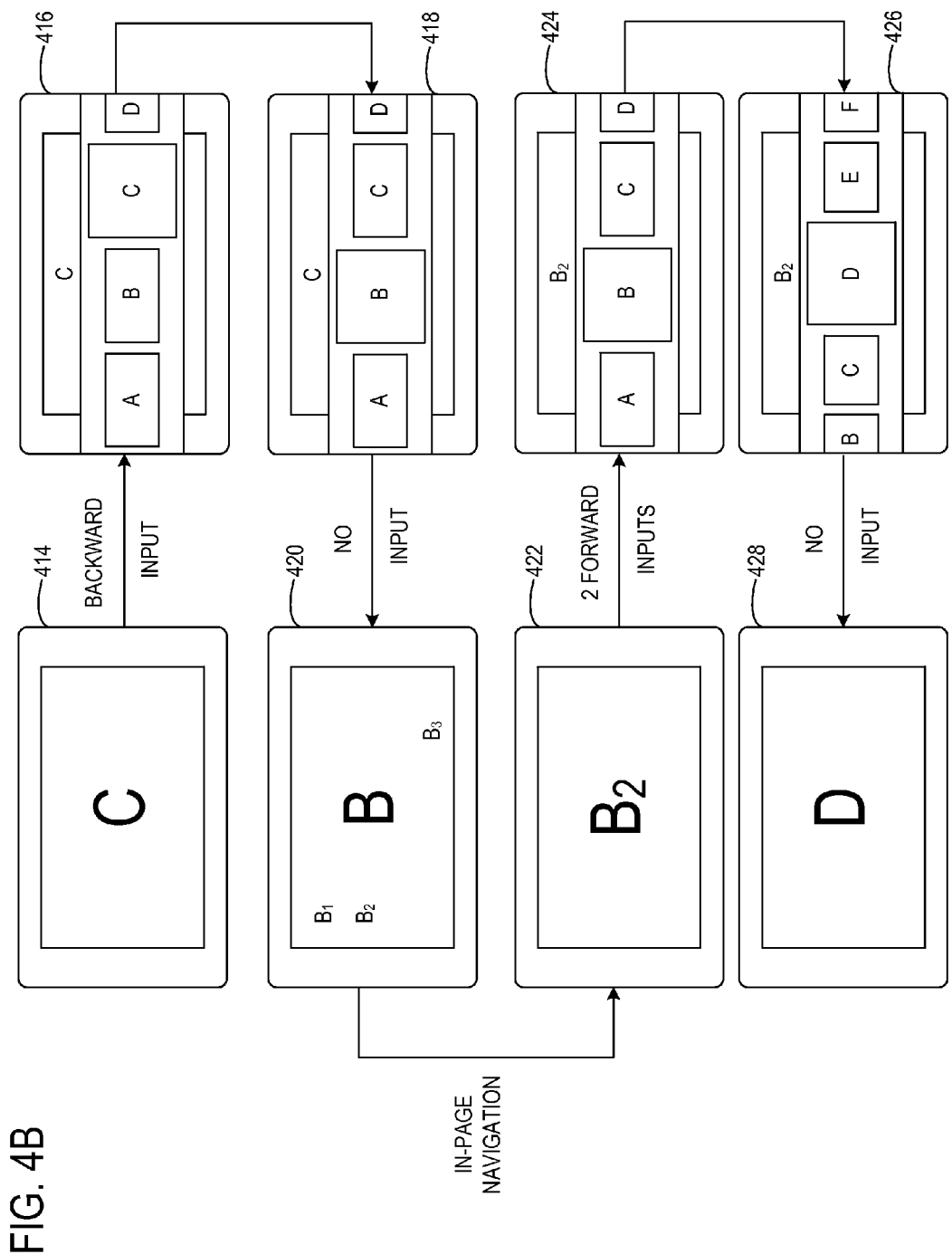

FIG. 3 shows a flow diagram depicting an embodiment of a method for navigating a website list via a web browser, and FIGS. 4A-4B illustrate a schematic depiction of a series of website list navigation commands and corresponding responses displayed according to an embodiment of the present disclosure. Method 300 includes, at 302, receiving a user input requesting to initiate browsing within a website list. The user input may be received from any suitable device. As non-limiting examples, the user input may be received from a hand-held video game controller 304, image sensor 306 (two-dimensional or depth), one or more microphones 308, and/or a remote control unit 310. In other examples, the user input may be received via a keyboard, touch sensor, mouse control, inertial motion sensor, and/or any other suitable user input device. The input received may correspond to a particular control that is configured to initiate web list browsing, or may correspond to a control that is configured both to initiate browsing as well as to conduct navigation during browsing.

As a more specific non-limiting example, in the context of a hand-held video game controller, a left bumper input may be configured to navigate one direction in a list (e.g. backward 314), and a right bumper input may be configured to navigate in another direction (e.g. forward 312), such that pressing either bumper causes navigation to a next web address in the list in a corresponding direction. In such an example, in some embodiments a user may be able to initiate navigation within a website list by selecting either of these controls. In other words, a user may be able to navigate from a website not in the list to a first location (or other initial location) in the list by pressing forward or backward website list navigation controls. In other embodiments, a user may actuate a different dedicated control (e.g. a trigger or button control) to launch list navigation, and then may use the bumper commands to navigate within the list. Similarly, in the context of a remote control unit, a user may be able to initiate and conduct navigation via a control such as channel up/down buttons. Further, in the context of a sensor system including one or more image sensors and/or microphones, a user may be able to navigate with left/right swipe gestures, and/or voice commands ("favorites," "forward," "backward," etc.). It will be understood that these specific embodiments are presented for the purpose of example, and are not intended to be limiting in any manner.

Upon receiving the user input, method 300 next comprises, at 316, sending to a display device a representation of a navigational overlay that illustrates a current location within a predefined list of web addresses. The current position may be an initial current position (where the input is used to initiate interaction with the list of websites), or may be a change from a previous location with the website list.

Referring briefly to FIG. 4A, an example of browsing to an initial location with a website list is shown at 402 and 406. First, at 402, the browser is displaying a website that is not in the favorites list. Next, in response to a forward or backward navigational input, a navigational overlay 404 is displayed at 406. The navigational overlay 404 displays representations of at least a portion of the websites in the list of websites, and also illustrates a current location within the list as list site A. The current location is shown in the navigational overlay 404 as a larger representation for the current location relative to other locations, but may be highlighted in any other suitable manner (color, brightness, location on display, etc.).

In the depicted example, the non-list website remains loaded while the navigational overlay is displayed. However, any other suitable background may be displayed behind the navigational overlay. Further, the navigational overlay 404 may be displayed for any suitable period of time. For example, in some embodiments, the navigational overlay 404 may continue to be displayed until no additional navigational inputs are received for a predetermined period of time. As such, referring again to FIG. 3, method 300 comprises, at 318, determining whether any additional navigational inputs are received within a predetermined period of time. If a second input and any additional inputs are received, then method 300 returns to 316, where a corresponding change in current location within the list is displayed. Otherwise, as described below, if none are received, then display of the navigational overlay may be ceased and website content may be obtained from web address at the current location.

FIG. 4A illustrates two additional navigational inputs each received within a predetermined period of time from an immediately prior navigational input. First, in response to a forward navigational input, as illustrated at 408, the current location within the list is moved forward (i.e. one location serially within the list in a first direction), and the new current location ("list site B") is highlighted in the navigational overlay 404. Next, in response to another forward navigational input, as illustrated at 410, the current location within the list is moved forward another location, and the new current location ("list site C") is highlighted in the navigational overlay 404. The transitions may be animated, as illustrated, or may be performed in any other suitable manner.

Returning to FIG. 3, if it is determined, as mentioned above, that no additional website list navigational inputs are received prior to expiration of the predetermined time after an immediately prior website list navigation command, then method 300 comprises, at 320, ceasing sending of the navigational overlay to the display device, and at 322 obtaining website content from the web address at the current location within the predefined list of web addresses. Method 300 further comprises, at 324, sending a representation of the website content is sent to the display device. This is illustrated in FIG. 4A at 412, where display of the navigational overlay is ceased, and content from list site C is downloaded and displayed. It will be understood that, in other embodiments, content for websites in the predefined list of websites may be downloaded each time a user moves locations within the navigational overlay, rather than obtaining content for a last location in a sequence of navigational commands. It will further be understood that the predetermined time may have any suitable value, and in some embodiments may be user configurable.

In some embodiments, scenarios may exist where navigation in a list may not begin at a first site (or other default initial site) in the list. For example, if a user is conducting website navigation outside of the predefined list of websites and navigates to a selected website that is in a predefined list, then if the user initiates website list browsing while at that site, browsing within the list may start at the location of that site within the list. Similarly, if a user, while conducting website list navigation, performs any in-page navigation (i.e. selecting links within a website in the list) that results in navigation away from the list, resumption of list navigation (e.g. by entering a left-bumper, right-bumper, or other list navigation command) may occur at the list website at which the user began the in-page navigation.

FIG. 4B shows an example embodiment of exiting website list navigation via in-page navigation, and then reentering website list navigation at the point of prior exit. First, as shown at 414, website navigation begins at website C, which was the endpoint in the immediately prior website list navigation sequence illustrated in FIG. 4A. Upon receipt of a backward navigation command, the navigational overlay is displayed, as shown at 416, and then the navigational overlay shows navigation one website in a corresponding direction within the list, as shown at 418. As shown at 420, the website at which navigation stopped (list site B) comprises in-page navigation links $B_1$, $B_2$ and $B_3$ which a user may select to navigate to corresponding pages. As the web page at link $B_2$ is not within the predefined list of websites, navigation to page $B_2$ occurs without displaying the navigational overlay, as shown at 422.

Next, when the user again enters website list navigation while on non-list page $B_2$, website list navigation begins at website B. For example, as illustrated at 424, two forward list navigation commands first bring up display of the navigational overlay 404, and then transition to a current location two websites forward from website B (namely, to website D), is illustrated at 426. After receiving no additional website list navigation commands within the predetermined time period, display of the navigational overlay is ceased, and website content is obtained for display as website D, as shown at 428.

In some instances, a user may wish to cancel website list navigation after invoking display of the navigational overlay. For example, a user may be performing non-list navigation and accidentally press a website list navigation control. Thus, to prevent unwanted navigation to a website within the predefined website list, a dismiss control may be provided to allow the user to request cancellation of the website list navigation command before navigation to a website list address occurs. As a more specific example, a user that is browsing via a video game controller may inadvertently press a left or right bumper control of the website, thereby potentially causing navigation to a first address, or other default address, within the website list. To prevent such navigation from occurring, the user may press another button on the video game controller that cancels navigation and ceases display of the navigational overlay. In this manner, the user may cancel the display of the navigational overlay and cause the website content from the initial website in the website address list not to be obtained. It will be understood that other embodiments may utilize input devices other than video game controllers, as mentioned above.

In some embodiments, the methods and processes described above may be tied to a computing system of one or more computing devices. In particular, such methods and processes may be implemented as a computer-application program or service, an application-programming interface (API), a library, and/or other computer-program product.

Figure 5:
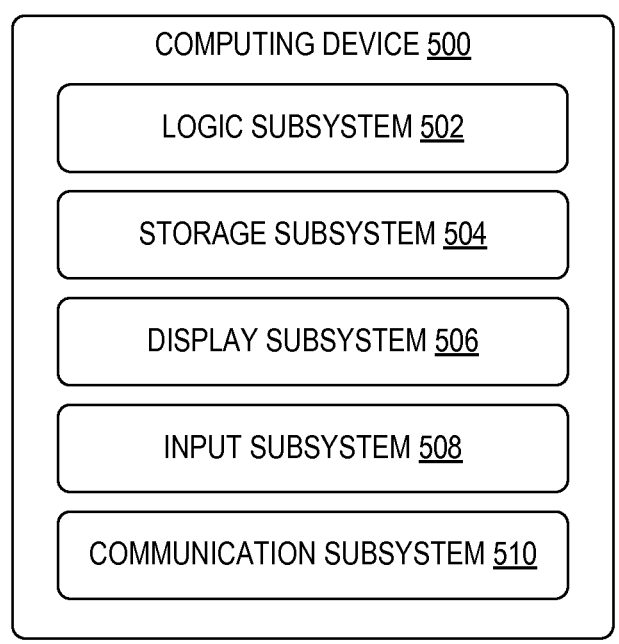
FIG. 5 shows an example embodiment of a computing system.

FIG. 5 schematically shows a non-limiting embodiment of a computing system 500 that can enact one or more of the methods and processes described above. Computing system 500 is shown in simplified form. It will be understood that virtually any computer architecture may be used without departing from the scope of this disclosure. In different embodiments, computing system 500 may take the form of a mainframe computer, server computer, desktop computer, laptop computer, tablet computer, home-entertainment computer, network computing device, gaming device, mobile computing device, mobile communication device (e.g., smart phone), etc.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 504 includes one or more physical devices configured to hold data and/or instructions executable by the logic subsystem to implement the methods and processes described herein. When such methods and processes are implemented, the state of storage subsystem 504 may be transformed—e.g., to hold different data.

Storage subsystem 504 may include removable media and/or built-in devices. Storage subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, in some embodiments, aspects of the instructions described herein may be propagated by a pure signal (e.g., an electromagnetic signal, an optical signal, etc.) via a communications medium, as opposed to a storage medium. Furthermore, data and/or other forms of information pertaining to the present disclosure may be propagated by a pure signal.

In some embodiments, aspects of logic subsystem 502 and of storage subsystem 504 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 500 implemented to perform a particular function. In some cases, a module, program, or engine may be instantiated via logic subsystem 502 executing instructions held by storage subsystem 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method of operating a web browser, the method comprising:
   receiving a user input corresponding to a web address list navigation command;
   sending to the display device a representation of a navigational overlay that illustrates a change of a current location within a predefined list of web addresses responsive to the user input; and after sending the representation of the navigational overlay that illustrates the change in current location within the predefined list of web addresses, ceasing sending of the representation of the navigational overlay to the display device, and sending to the display device a representation of website content obtained from a web address at the current location within the predefined list of web addresses.

2. The method of claim 1, wherein the user input is a last user input of a sequence of navigation commands received during display of the navigational overlay, and further comprising:
receiving one or more additional user inputs of web address list navigation commands prior to receiving the last user input of the sequence of navigation commands; and
in response to each additional user input, illustrating via the navigational overlay navigation of one web address location in the predefined list of web addresses.

3. The method of claim 2, further comprising not obtaining any website content for any web addresses in the list responsive to each user input until ceasing sending of the navigational overlay to the display device.

4. The method of claim 2, further comprising ceasing sending of the navigational overlay to the display device if no input of a website navigation command is received within a predetermined time after a previous user input.

5. The method of claim 1, further comprising obtaining website content from the web address at the current location within the predefined list of web addresses after ceasing sending the representation of the navigational overlay.

6. The method of claim 1, further comprising receiving a user input requesting cancelling navigation within the website list, and ceasing the sending of the representation of the navigational overlay to the display device and cancelling obtaining of website content in response.

7. The method of claim 1, wherein receiving the user input comprises receiving the user input from a video game controller.

8. The method of claim 7, wherein the forward web address list navigation command comprises a right bumper input, and wherein the backward web address list navigation control comprises a left bumper input.

9. The method of claim 1, wherein receiving the user input comprises receiving the user input via one or more of a microphone, an image sensor, and a remote control unit.

10. The method of claim 1, further comprising receiving a user input requesting to initiate list interaction, the user input requesting to initiate list interaction comprising one of a forward web address list navigation command and a backward web address list navigation command, and in response displaying the navigational overlay illustrating a current location as an initial web address of the predefined list of web addresses.

11. The method of claim 1, further comprising receiving a user input requesting to browse to a selected web address within the predefined list of web addresses, browsing to the selected web address, then receiving an input configured to initiate list navigation via the navigational overlay, and in response displaying the current location in the list as the selected web address.

12. A video game system, comprising:
a logic subsystem configured to execute instructions; and
a storage subsystem comprising stored instructions that are executable by the logic subsystem to:
receive a first user input corresponding to one of a forward web address list navigation command and a backward web address list navigation command, the first input comprising one or more of an input from a handheld video game controller, a voice command received via a microphone, a gesture command received via an image sensor, and an input received from a remote control unit;
in response to the first user input, navigate to a first selected web address in the predefined list of web addresses and send to a display device a representation of content obtained from the first selected web address;
receive a second input corresponding to one of a forward web address list navigation command and a backward web address list navigation command, the second input comprising one or more of an input from a handheld video game controller, a voice command received via a microphone, a gesture command received via an image sensor, and an input received from a remote control unit; and
in response to the second input,
navigate to a second selected web address in the predefined list of web addresses that is next to the first selected web address in the predefined list of web addresses and send to the display device a representation of content obtained from the second selected web address.

13. The video game system of claim 12, further comprising a hand-held video game controller, and wherein the forward web address navigation command comprises a right video game controller bumper user input and wherein the backward web address navigation command comprises a left video game controller bumper user input.

14. The video game system of claim 12, wherein the first selected web address comprises a web address other than a first web address in the predefined list of web addresses.

15. The video game system of claim 12, wherein the first user input is a part of a sequence of two or more web address list navigation commands each requesting a serial change of one location in the predefined list of web addresses.

16. The video game system of claim 15, wherein the instructions are further executable to send to the display device display a navigational overlay in response to the first user input and the second user input, the navigational overlay illustrating a location of the first selected web address and the second selected web address in the predefined list of web addresses.

17. On a video game system, a method of operating a web browser, the method comprising:
receiving a user input from a hand-held video game controller, the user input corresponding to one of a forward web address list navigation command and a backward web address list navigation command;
in response to the user input, sending to a display device a representation of a navigational overlay that illustrates a change in current location within a predefined list of web addresses;
if one or more additional user inputs are received before expiration of a predetermined time from each immediately previous user input, each of the one or more additional user inputs corresponding to one of a forward web address list navigation command and a backward web address list navigation command, then sending to the display for each user input a representation of a change of the current location within the predefined list of web addresses in a corresponding direction;
if no additional user inputs are received before the expiration of the predetermined time from the immediately previous user input, then ceasing sending of the navigational overlay to the display device, obtaining website content from the web address at the current location within the predefined list of web addresses, and sending a representation of the website content to the display.

18. The method of claim 17, further comprising not obtaining any website content after receiving the user input until ceasing sending of the navigational overlay to the display device.

19. The method of claim 17, wherein the forward web address list navigation command comprises a right bumper input, and wherein the backward web address list navigation control comprises a left bumper input.

20. The method of claim 17, further comprising receiving a user input requesting to initiate list interaction in a new user session, the user input requesting to initiate list interaction comprising one of a forward web address list navigation command and a backward web address list navigation command, and in response displaying the navigational overlay illustrating the current location as an initial web address of the predefined list of web addresses.

* * * * *